United States Patent [19]
Tracy et al.

[11] Patent Number: 5,980,756
[45] Date of Patent: Nov. 9, 1999

[54] TREATMENT METHOD AND SYSTEM FOR AIRCRAFT TOILET WASTE WATER

[76] Inventors: Thomas R. Tracy, 2175 Fairmeadow Dr., Boise, Id. 83704; H. Ed Hohrein, 16719 N. Can-Ada Rd., Nampa, Id. 83687

[21] Appl. No.: 08/717,107

[22] Filed: Sep. 20, 1996

[51] Int. Cl.[6] .................................................. B01D 61/00
[52] U.S. Cl. .............................. 210/744; 210/808; 4/316; 4/323
[58] Field of Search .................................... 210/744, 767, 210/808; 4/316, 323

[56] References Cited

U.S. PATENT DOCUMENTS

| | | | |
|---|---|---|---|
| 3,995,328 | 12/1976 | Carolan et al. . | |
| 4,063,315 | 12/1977 | Carolan et al. | 4/316 |
| 4,202,061 | 5/1980 | Waters | 4/316 |
| 4,357,719 | 11/1982 | Badger et al. | 210/767 |
| 4,521,925 | 6/1985 | Chen et al. | 4/323 |
| 4,804,464 | 2/1989 | Schevey . | |
| 4,871,452 | 10/1989 | Kohler et al. . | |
| 5,035,011 | 7/1991 | Rozenblatt et al. | 4/316 |
| 5,080,797 | 1/1992 | Volkner . | |
| 5,443,733 | 8/1995 | Mueller et al. . | |
| 5,454,936 | 10/1995 | Ask et al. . | |

*Primary Examiner*—Jay H. Woo
*Assistant Examiner*—Betsey J. Morrison
*Attorney, Agent, or Firm*—McCutchen, Doyle, Brown & Enersen

[57] ABSTRACT

A method and system are described for the treatment of aircraft toilet waste water to permit discharge of the treated water to the atmosphere during flight, utilizing the pressure differential that is created between the aircraft's cabin pressure and the external atmosphere. The system includes a filter to remove suspended solids and other contaminants from the waste water, and may also include means to purify the water to potable water standards and means to recirculate the treated water for re-use on the aircraft.

7 Claims, 5 Drawing Sheets

TREATMENT METHOD AND SYSTEM FOR AIRCRAFT TOILET WASTE WATER

FIELD OF THE INVENTION

The invention relates generally to a method and system for treating aircraft toilet waste water during flight. More particularly, the invention relates to a waste water treatment system in which contaminants are removed from toilet waste water to a level sufficient to permit discharge of the treated water to the atmosphere.

BACKGROUND OF THE INVENTION

For commercial air travel, an efficiently and effectively operating toilet system must be maintained for the convenience and well-being of the passengers and crew. With current aircraft design, waste from the toilet system is stored on board in one or more holding tanks for the duration of the flight. Over the course of a nine to eleven hour international flight with a wide-body airplane such as one of the Boeing 747 models, it is not unusual for as much as 2500 pounds of waste water to accumulate in the holding tanks. With narrow-body aircraft such as a Boeing 727 model, in excess of 800 pounds of waste water can be accumulated.

Occasionally, the toilet system will fill to capacity, causing the system to be closed and unusable for a portion of the flight. Additionally, even if the holding tanks do not reach capacity, frequently there will be sufficient accumulation to produce objectionable odors which will be picked up by the plane's ventilation system and carried throughout the cabin.

These problems have been exacerbated over the past several years due to the increased competition in air travel. To reduce cost and improve competitiveness, many airlines have increased the number of seats in each plane and, on shorter flights, do not empty the holding tanks each time that the plane lands. The additional weight thus carried also results in increased consumption of fuel, in turn adding to the overall cost for the airlines to do business.

To minimize the waste water that must be stored during flight, a variety of systems have been developed to re-use the waste water to provide the water necessary to operate the aircraft toilet system. For example, U.S. Pat. No. 3,995,328, "Vacuum Toilet System", describes a recirculating vacuum toilet system in which water is recovered from the toilet waste and recycled as rinsing fluid to clean the toilet bowl. Vacuum toilet systems have also been developed in which untreated "grey" water from sinks and galleys on the aircraft is used as toilet rinse water. U.S. Pat. No. 5,454,936, "Vacuum Toilet System" thus describes a system in which the grey water is collected from the lavatory sinks in a secondary tank and thereafter delivered as rinse water for the toilets. In both of these systems, however, the waste water must still be stored on board the aircraft and consequently, neither system provides a satisfactory solution to the problems confronting the airline industry.

A system has also been described for dehydrating aircraft waste water and discharging or re-using the water, U.S. Pat. No. 5,080,797, "Method of Disposing of Fecal Matter From Toilet Systems In Fast Moving Vehicles". This system, however, proposes to use a pump to force contaminated waste water through a heated dehydration tank, and thus represents an approach that is impractical to employ in commercial aviation, in view of the high levels of energy that would be required and safety concerns due to the potential for overheating.

Untreated grey water from the sinks and galleys of the aircraft, if not recirculated as toilet rinse water, is discharged to the external atmosphere during flight through the drain mast of the plane, using the pressure differential between the cabin pressure of the aircraft and the external atmosphere. If this water is used to rinse the toilets, however, it must be stored on board the aircraft, because the level of contamination exceeds the regulatory standards for water that may be discharged to the atmosphere. While the use of sink water thus offers a cleaner and more appealing rinse water for the aircraft toilet system than re-use of toilet waste water, it does not represent a satisfactory solution.

It would be highly advantageous, therefore, if the toilet waste water, including recirculated waste water from the sinks and galleys, could be decontaminated in flight to a level sufficient to permit it to be discharged to the atmosphere. It is accordingly a principal object of the present invention to provide a method and system for treating aircraft waste water to remove contaminants and discharge the treated water to the atmosphere during flight.

SUMMARY OF THE INVENTION

The present invention is directed to a waste water treatment method and system in which aircraft toilet waste water is treated to remove contaminants to a level sufficient to permit the treated water to be discharged from the aircraft during flight. The treated water is discharged at cruising altitudes through a drain mast, utilizing the pressure differential that exists between the aircraft's cabin pressure and the external atmosphere.

The waste water treatment system is operatively connected to the lavatory holding tanks and the drain mast of the aircraft and includes means to filter the waste water which is evacuated from the holding tanks to remove suspended solids and other contaminants. If the treated waste water is recirculated for re-use as flush or rinse water for the toilet system, a pre-determined miminum level of water is maintained in the holding tanks, typically at a level of approximately 10% to about 30%, preferably about 15 to about 25%, of the capacity of the holding tank, to insure that the toilet system will operate during flight in its normal mode. With current aircraft, from about three to about five gallons of waste water will be maintained in the holding tanks by positioning the evacuation means in the holding tank at the desired pre-determined depth. The water level in the holding tanks is also preferably maintained slightly below the evacuation means so that air and accumulated odors are evacuated from the holding tank when the system is operative.

Waste water treated in accordance with the present invention is ordinarilly acceptable for discharge from the aircraft during flight. Under certain circumstances, however, it may be desirable to treat the water further to meet potable drinking water standards. Under these circumstances, a sterilization chamber may be included in the treatment system to purify the water prior to discharge or re-use. The sterilization chamber is positioned downstream of the filtering means and preferably includes a source of ultra violet light to irradiate waste water. The invention may also include means to re-circulate the treated waste water for re-use in the toilet system of the aircraft.

DETAILED DESCRIPTION OF THE INVENTION

Figure 1:
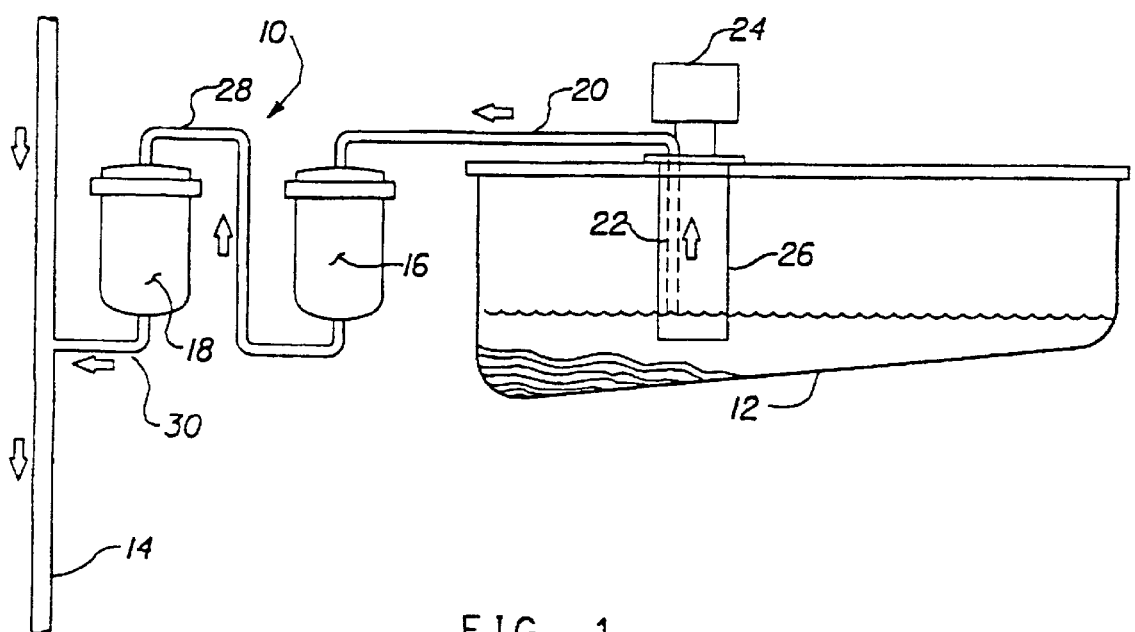
FIG. 1 is a diagrammatic representation of one embodiment of the present invention in which the treatment system includes first and second stage filters as separate units.
Figure 2:
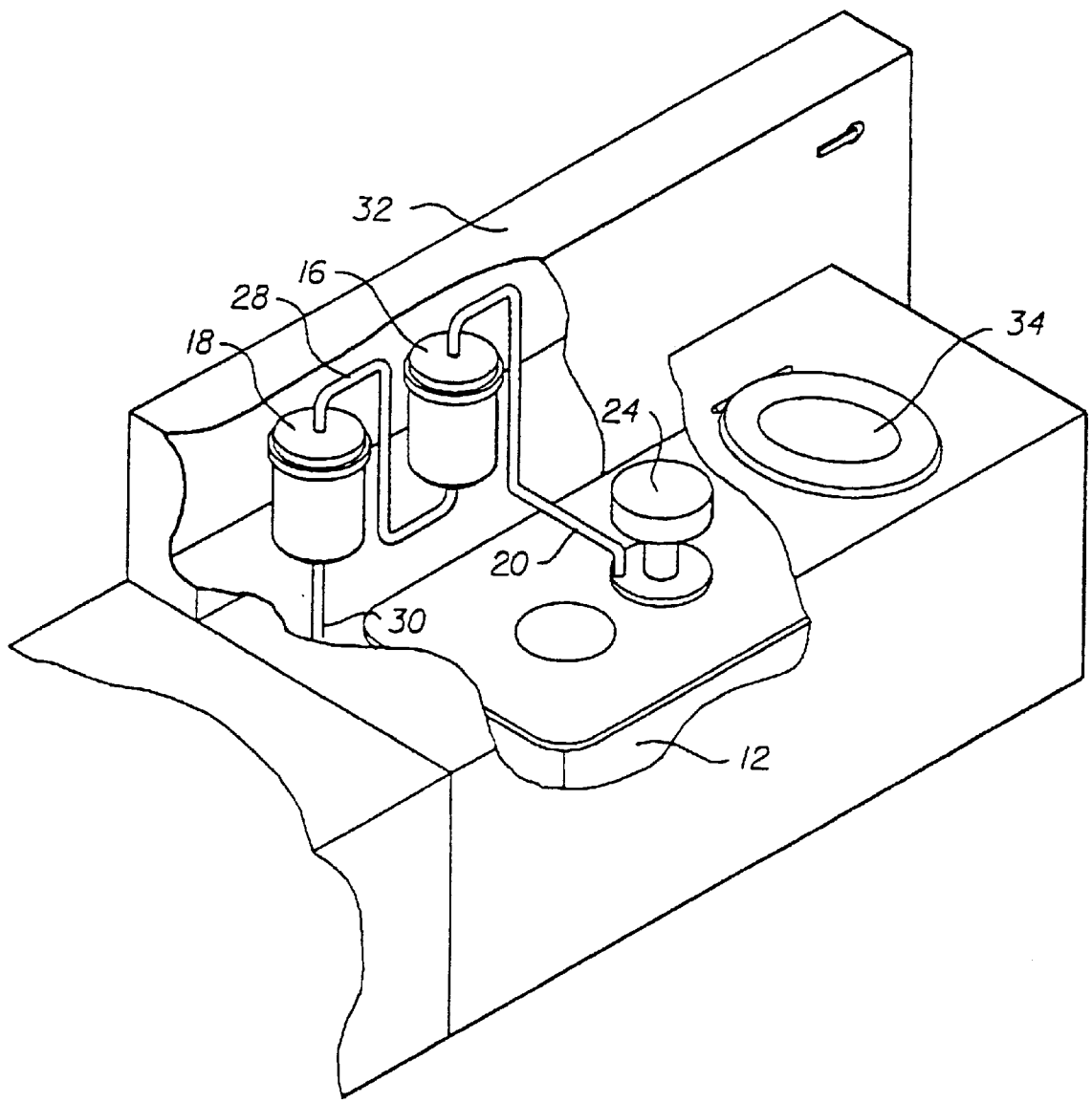
FIG. 2 is a perspective view of the invention depicted in FIG. 1, installed in an aircraft lavatory.

Referring to FIGS. 1 and 2, the waste water treatment system, designated generally by numeral 10, is connected between holding tank 12 and drain mast 14. The waste water accumulates in holding tank 12 and is evacuated from the tank through tube 20, through filters 16 and 18, and is discharged from the aircraft through drain mast 14. The waste water is evacuated from the holding tank by the pressure differential that exists during flight between the holding tank 12, which is maintained at the internal cabin pressure, and the drain mast which is open to the external atmosphere. Thus, when waste water in the tank 12 reaches the level of inlet end 22 of the influent or evacuation tube 20, it is automatically evacuated from the holding tank.

Figure 3:
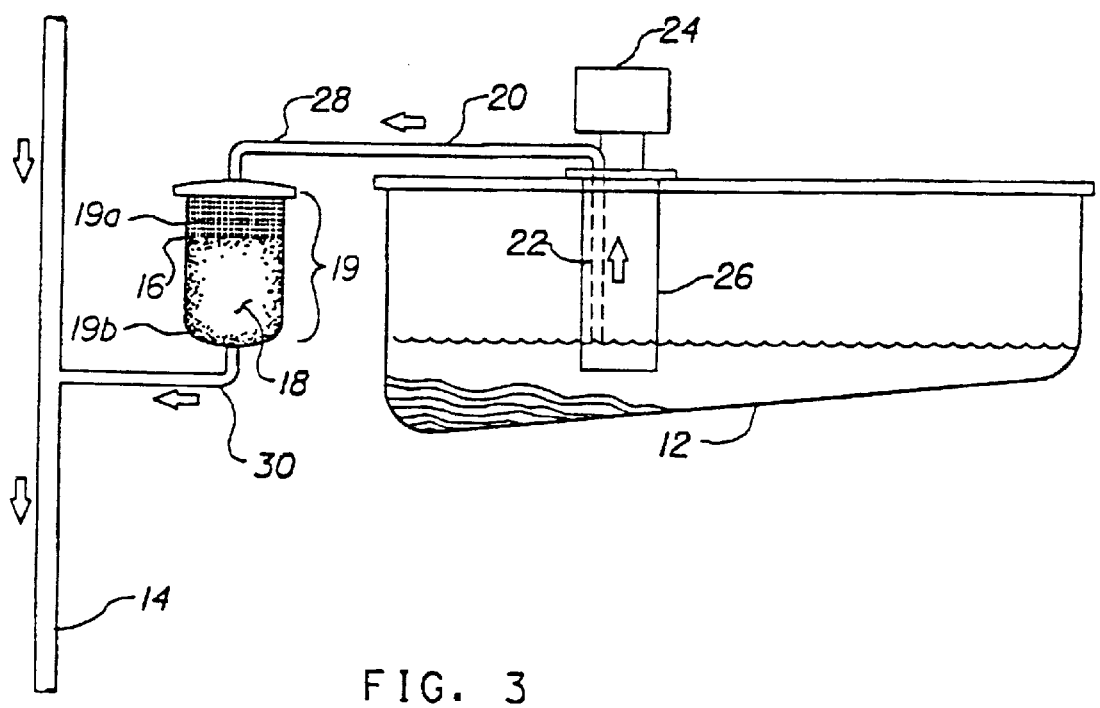
FIG. 3 is a diagrammatic representation of another embodiment of the invention in which the treatment system includes first and second stage filters as a single unit.

In the treatment system of FIGS. 1 and 2, a first stage filter system removes particulate matter such as silt and sediment, giardia cysts and other larger contaminants, while second stage filter 18 removes undesirable chemical, pesticides, odor causing agents, and other smaller contaminants. One example of a suitable first stage filter is a pleated, solid particulate filter that can remove contaminates of approximately one micron or larger. An example of a suitable second stage filter is a granulated activated carbon filter or similar carbon micro-filtration device that is capable of removing contaminants as small as 0.5 microns. In the embodiment illustrated in FIG. 3, the first and second stage filters are combined into a single filtration unit 19, which includes a first stage filter element in 19a and a second stage filter element 19b. Preferably, the filters 16, 18 and 19 will be cartridge units or modules to facilitate periodic replacement as needed.

As shown in FIG. 2, the treatment system 10 is installed in the lavatory of an aircraft within compartment 32, immediately behind toilet 34 and holding tank 12 for aircraft that utilize individual holding tanks. For aircraft that utilize a central holding tank for the various lavatories on board, the treatment system will be located in the vicinity of the central holding tank.

Referring again to FIG. 1, when waste water is evacuated from the holding tank 12 through tube 20, it passes first through filter 16, through conduit 28, second stage filter 18, and conduit 30, and is discharged from the aircraft through drain mast 14. As illustrated, the holding tank 12, as is conventional on most commercial aircraft, has a sloping bottom to concentrate solid waste at one end of the tank. Inlet end 22 of evacuation tube 20 is positioned away from the deeper end of the holding tank, to minimize the amount of solid particulate matter evacuated through tube 20. For toilet systems that recirculate toilet waste water for flushing or rinsing, end 22 of evacuation tube 20 will be submersed to a depth in holding tank 12 to permit approximately 3 to about 5 gallons of water to remain in the holding tank. This represents approximately 10 to about 30% of the capacity of the holding tank.

In recirculating toilet systems, at least some of the aircraft's holding tanks will include a pump 24 to recirculate waste water to the toilets as rinse water. Pump 24 is typically surrounded by a wire mesh screen 26 to screen solid particles from the waste water. The influent tube 20 is positioned within the pump screen. If the holding tank does not include a pump screen, a similar screening filter will be placed at or over the submersed end of the evacuation tube 20.

When the treatment system is in operation, waste water is evacuated through the treatment system 10 by the pressure differential between holding tank 12 and the drain mast 14. The system will operate effectively at pressure differentials ranging between approximately 4.0 and 8.5 psi, although the operating pressures may vary somewhat, depending upon the type of filters used, the desired rate of flow of waste water through the treatment system 10, and other system design parameters, such as the size of the evacuation tube and drain mast and the level of waste water maintained in the holding tank. Differential pressures in this range are generally achieved in flight at altitudes above approximately 15,000 feet. The actual pressure differential will vary depending upon the aircraft's altitude and the cabin pressure. In typical flight situations, it will not be necessary to utilize treatment system 10 for the limited time in which the aircraft will be below 15,000 feet. Any waste water generated during this period can be readily stored in holding tank 12 until it is removed during ground service operations.

For recirculating toilet systems, pump 24 is preferably controlled to permit approximately 3 to about 5 gallons of waste water to remain in holding tank 12. This is accomplished most readily by positioning the end 22 of evacuation tube 20 at a predetermined appropriate depth in tank 12, selected to ensure that sufficient waste water remains in the tank as the volume of waste water in the tank decreases incrementally with increases in the volume of the solid matter. Alternatively, the volume of waste water in tank 12 can be maintained by installing a flow control valve in the evacuation tube 20 operatively coupled to a float or other such mechanism to sense the level of water in the holding tank.

Figure 4:
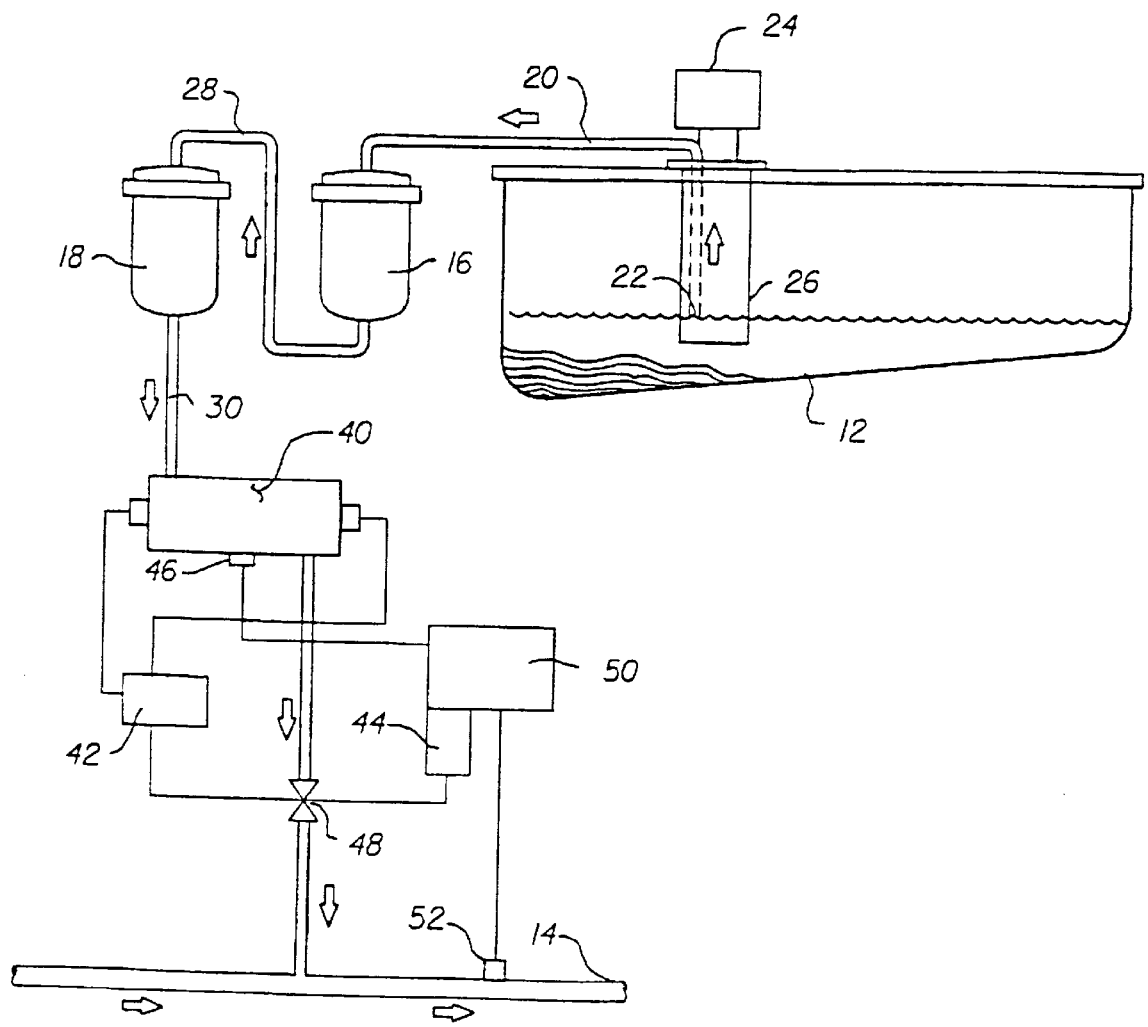
FIG. 4 is a diagrammatic representation of an additional embodiment of the invention in which the treatment system includes a sterilization chamber positioned downstream of the filters.

Referring now to FIG. 4, an optional sterilization chamber 40 may be included in the treatment system to purify the treated water to potable water standards. In this embodiment, sterilization chamber 40 is positioned downstream of second stage filter 18. A source of ultraviolet light 42 is preferably used to irradiate water passing through chamber 40. The light source 42 should be capable of delivering a minimum of approximately 40,000 microwatt-second per square centimeter of energy into the waste water, which is ordinarily sufficient energy to destroy microbiological organisms and other contaminants present in the water. Although irradiating the waste water with ultra violet light is a preferred means of sterilization, other suitable sterilization processes may also be used, such as exposing the water to microwaves or treating chemically the water with chlorine or iodine.

To ensure that the water is properly sterilized, a flow controller 44 controls the flow of water through the sterilization chamber 40. The controller 44 includes a sensor 46, a solenoid operated flow control valve 48 and a controller 50. Sensor 46 is operatively coupled to sterilization chamber 40 to measure the purification level of the waste water. The sensor 46 is preferably a clarity sensor that measures the level of clarity of the treated water as an indication of its purity. If the clarity of the treated water is below acceptable levels, control valve 48 is restricted or closed to hold the water inside the sterilization chamber 40 until the water reaches an acceptable level of clarity. When the control valve 48 is closed and no water is flowing thorough the treatment system 10, the toilets and holding tanks will function in their original mode, permitting waste water to collect in holding tank 12.

Vacuum sensor 52 functions to signal controller 50 that a vacuum or negative pressure exists in drain mast 14, which is an indication that the aircraft has attained sufficient altitude (normally, approximately 15,000 feet) to turn on and operate the treatment system. Conversely, when the aircraft is below an altitude of about 15,000 feet, vacuum pressure is reduced, sending a signal from sensor 52 to controller 50 to shut down the treatment system.

In the embodiments of FIGS. 1 to 3 and FIG. 4, the water level in holding tank 12 is maintained slightly below (e.g., approximately 2 to 4 inches) the inlet end 22 of evacuation tube 20. This enables air and accumulated odors to be evacuated from the tank and to be discharged from the aircraft during flight, thus facilitating maintaining clean air within the aircraft.

Figure 5:
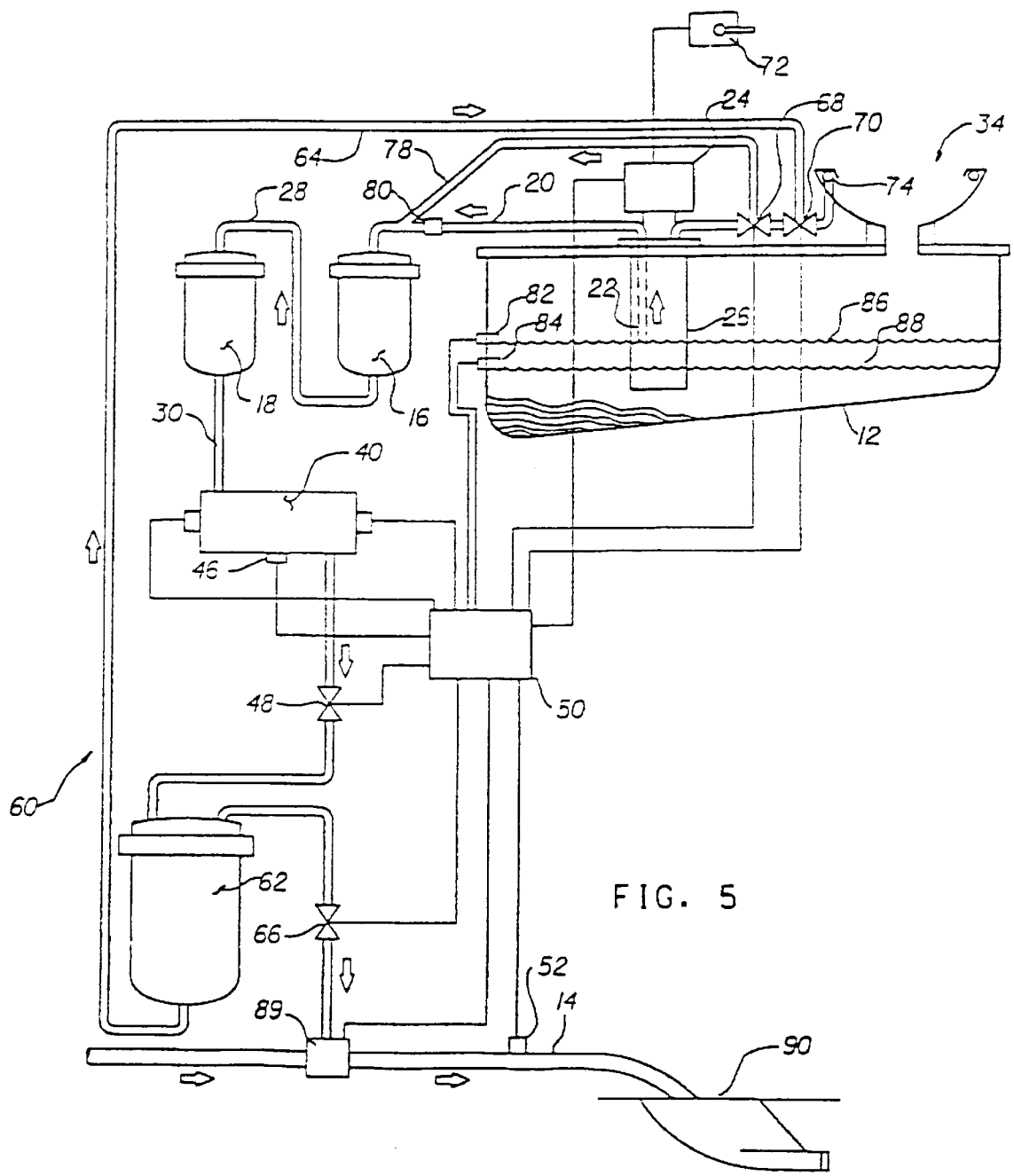
FIG. 5 is a diagrammatic representation of an embodiment of the invention in which the treatment system is used in conjunction with a re-circulation system to re-use the treated waste water as toilet rinse water.

Turning now to FIG. 5, the treatment system 10 is illustrated in conjunction with a recirculation system 60 to permit reuse of the treated water as toilet flush or rinse water. In the particular embodiment illustrated, the recirculation system 60 includes a flush tank 62, recirculation tube 64, and a series of first, second and third flow control valves, 66, 68 and 70.

Flush tank 62 is interposed between treatment system 10 and drain mast 14. Treated water is discharged from treatment system 10 into flush tank 62 through tube 30. The treated water is thereafter discharged from the aircraft through drain mast 14 or is recirculated to toilet 34 through recirculation tube 64. Recirculation is activated by flushing toilet 34. In conventional aircraft toilet systems, when flush lever 72 is depressed, pump 24 turns on for the flush cycle, which typically lasts on the order of about six seconds, to pump water out of holding tank 12 into toilet flush ring 74. In the recirculation system of the present invention, pump 24 is also activated by depressing flush lever 72. But, instead of pumping contaminated waste water from the holding tank, treated water is pumped from flush tank 62 into flush ring 74. Flush lever 72, pump 24 and flow control valves 66, 68 and 70 are operatively interconnected through controller 50. When flush lever 72 is depressed, pump 24 is activated, first flow control valve 66 is closed and second and third flow control valves 68 and 70 are opened. Water thereafter flows out of holding tank 12, through treatment system via valve 68 and tube 78, into flush tank 62, and back to toilet 34 through recirculation tube 64, valve 70 and flush ring 74. In operation, pump 24 provides additional pressure to the system which increases the rate of flow of waste water through the treatment system and extends the useful life of the filter. Recirculation system 60 remains activated until the flush cycle is over, at which time pump 24 is turned off, flow control valves 68 and 70 are closed and flow control valve 66 is re-opened. Preferably, a one way valve 80 is installed in influent tube 20 to prevent the water from being pumped directly back into holding tank 12 through influent tube 20.

An optional set of water level sensors 82 and 84 may be installed in the system to maintain the water in holding tank 12 at a predetermined level. High water level sensor 82 and low water level sensor 84 are operatively coupled to pump 24 through controller 50. When the water in holding tank 12 reaches a predetermined high level 86, sensor 82 turns on pump 24. Water is pumped through treatment system 10 until the water in holding tank 12 drops to a predetermined low level 88. When the water in holding tank 12 reaches low level 88, low level sensor 84 turns off pump 24. The use of pump 24 to supplement the flow of water through treatment system 10 allows the system to more effectively handle periodic surges in the volume of waste water entering holding tank 12. Such surges may occur, for example, in larger aircraft that utilize a central holding tank. The coincidental flushing of several toilets or the continual use of the toilets over a short period of time may cause a sudden and dramatic increase in the volume of waste water entering holding tank 12.

Controller 50, described above with reference to FIGS. 4 and 5, may be either a single flow controller to activate pump 24 and open and close valves 66, 68 and 70, or a series of two or more controllers to activate pump 24 and/or open and close valves 66, 68 and 70.

As illustrated in FIG. 5, this embodiment of the invention also includes an electrically actuated solenoid valve 89 which, when actuated by sensor 82, constricts the rate of drain mast suction to approximately 15% of normal from all of the lavatories, galleys, sinks, drinking fountains and other openings to the drain mast suction during an operating cycle of the invention. During this constricted operation, approximately 85% of the available drain mast suction is utilized by the method and system of this invention. When the level of waste water in the holding tank 12 reaches the minimum level 88, sensor 84 is actuated, opening valve 89 and permitting normal flow of water through the system for sinks and galleys. Drain mast 90 is heated, for example, up to approximately 140° Fahrenheit, to insure that the drain mast will remain open during flight, thus avoiding problems encountered in the past from time to time, when water or other chemicals being discharged from the aircraft through the drain mast froze and fell off or were sucked into the engine of the aircraft. On occasions, this has resulted in severe damage to aircraft.

The present invention thus provides a highly desirable solution to the problems of the prior art in an effective manner with a minimum of additional components for the aircraft. With the treatment method and system described and illustrated herein, the weight of the waste water that must be carried on board is reduced significantly, resulting in reduced fuel consumption and making commercial air travel more desirable by reducing objectionable odors on board.

It is apparent from the foregoing, that, although particular embodiments of the invention have been illustrated and described, various modifications can be made without departing from the spirit and scope of the invention. It is not intended that the invention be limited by the foregoing description, but only by the appended claims and their lawful equivalents.

What is claimed is:

1. A method of treating aircraft toilet waste water, comprising evacuating waste water from a holding tank for a toilet system utilizing a pressure differential between the pressure within the aircraft cabin and the external atmosphere when the aircraft is in flight wherein the contents of the holding tank comprise waste water, settled solid particulate matter, and suspended solid particulate matter, the evacuating does not dehydrate the settled solid particulate matter, and the evacuated waste water is free from settled solid particulate matter, filtering the evacuated waste water to remove suspended solid particulate matter and other contaminants, and discharging the filtered water to the atmosphere.

2. The method of claim 1, further comprising maintaining a pre-determined minimum level of water in the holding tank to provide sufficient water to permit the toilet system to operate in its normal mode.

3. The method of claim 2 in which the pre-determined minimum level is from about 10 to about 30% of the capacity of the holding tank.

4. The method of claim 3 in which the pre-determined minimum level is from about 15 to about 25% of the capacity of the holding tank.

5. The method of claims 1 or 2 in which a water level in the holding tank is maintained below an inlet end of means to evacuate water from the holding tank, whereby air and odors are evacuated from the holding tank and the aircraft.

6. A method of treating aircraft toilet waste water, comprising creating a pressure differential between the pressure within a holding tank for a toilet system of the aircraft and the external atmosphere, evacuating waste water from the holding tank using such pressure differential wherein the contents of the holding tank comprise waste water, settled solid particulate matter, and suspended solid particulate matter, the evacuating does not dehydrate the settled solid particulate matter, and the evacuated waste water is free from settled solid particulate matter, filtering the evacuated waste water to remove suspended solid particulate matter and other contaminants, and discharging the filtered water to the atmosphere.

7. The method of claim 6, further comprising evacuating air and odors from the holding tank with toilet waste water to facilitate maintaining clean air within the cabin of the aircraft.

* * * * *